United States Patent
Matsuda

(10) Patent No.: US 10,858,507 B2
(45) Date of Patent: Dec. 8, 2020

(54) FIBER-REINFORCED POLYPROPYLENE-BASED RESIN COMPOSITION AND MOLDED PRODUCT THEREOF

(71) Applicant: PRIME POLYMER CO., LTD., Tokyo (JP)

(72) Inventor: Yuichi Matsuda, Sodegaura (JP)

(73) Assignee: PRIME POLYMER CO., LTD., Tokyo (JP)

( * ) Notice: Subject to any disclaimer, the term of this patent is extended or adjusted under 35 U.S.C. 154(b) by 48 days.

(21) Appl. No.: 16/300,026

(22) PCT Filed: May 9, 2017

(86) PCT No.: PCT/JP2017/017577
§ 371 (c)(1),
(2) Date: Nov. 8, 2018

(87) PCT Pub. No.: WO2017/195787
PCT Pub. Date: Nov. 16, 2017

(65) Prior Publication Data
US 2019/0144651 A1  May 16, 2019

(30) Foreign Application Priority Data
May 10, 2016 (JP) .................. 2016-094511

(51) Int. Cl.
*C08L 23/14* (2006.01)
*C08K 7/14* (2006.01)
(Continued)

(52) U.S. Cl.
CPC .............. *C08L 23/142* (2013.01); *B29B 9/14* (2013.01); *B29C 45/00* (2013.01);
(Continued)

(58) Field of Classification Search
CPC ........ C08L 23/142; C08L 23/12; C08L 23/10; B29B 9/14; B29C 45/00; B29C 45/0001;
(Continued)

(56) References Cited

U.S. PATENT DOCUMENTS

2005/0043495 A1  2/2005 Minami et al.
2005/0058820 A1  3/2005 Kitano et al.
(Continued)

FOREIGN PATENT DOCUMENTS

JP  63-142049 A  6/1988
JP  01-225648 A  9/1989
(Continued)

OTHER PUBLICATIONS

English machine translation of JP 2009-185121 (Year: 2009).*
(Continued)

*Primary Examiner* — John E Uselding
(74) *Attorney, Agent, or Firm* — Foley & Lardner LLP

(57) ABSTRACT

Disclosed is a fiber-reinforced polypropylene-based resin composition including a propylene-based polymer (A) and reinforcing fibers (B), in which when a content of at least one olefin-derived structural unit selected from ethylene and an α-olefin having 4 to 8 carbon atoms in the propylene-based polymer (A) is designated as E (% by mass) (the sum of the propylene-based polymer (A) and the reinforcing fibers (B) is designated as 100% by mass), and a mesopentad fraction of the propylene-based polymer (A) as measured by $^{13}$C-NMR is designated as M (%), the following Expression (1) and Expression (2) are satisfied, the fiber-reinforced polypropylene-based resin composition being a resin composition with which a molded product having excellent thermal and mechanical characteristics and having an excellent external appearance of the molded product surface (Continued)

(particularly, external appearance of a grained surface) can be produced.

$$85 \leq M \leq 99 \quad (1)$$

$$74 \leq M - 12E \leq 90 \quad (2)$$

8 Claims, 1 Drawing Sheet

(51) Int. Cl.
*C08J 5/04* (2006.01)
*B29C 45/00* (2006.01)
*C08K 7/02* (2006.01)
*C08L 23/10* (2006.01)
*B29B 9/14* (2006.01)
*C08F 10/06* (2006.01)
*C08L 23/12* (2006.01)
*B29K 23/00* (2006.01)
*B29K 309/08* (2006.01)

(52) U.S. Cl.
CPC ...... *B29C 45/0001* (2013.01); *B29C 45/0005* (2013.01); *C08F 10/06* (2013.01); *C08J 5/04* (2013.01); *C08J 5/043* (2013.01); *C08K 7/02* (2013.01); *C08K 7/14* (2013.01); *C08L 23/10* (2013.01); *C08L 23/12* (2013.01); *B29K 2023/12* (2013.01); *B29K 2309/08* (2013.01); *C08J 2323/12* (2013.01); *C08J 2323/14* (2013.01); *C08J 2423/12* (2013.01); *C08J 2423/14* (2013.01); *C08J 2423/30* (2013.01); *C08L 2205/025* (2013.01); *C08L 2205/03* (2013.01); *C08L 2205/035* (2013.01)

(58) Field of Classification Search
CPC ........ B29C 45/0005; C08F 10/06; C08J 5/04; C08J 5/043; C08K 7/02; C08K 7/14
See application file for complete search history.

(56) References Cited

U.S. PATENT DOCUMENTS

| | | |
|---|---|---|
| 2006/0110576 A1 | 5/2006 | Obara et al. |
| 2010/0298516 A1 | 11/2010 | Grazzi et al. |
| 2014/0242335 A1 | 8/2014 | Kondo et al. |
| 2015/0274948 A1 | 10/2015 | Fukuda et al. |
| 2015/0315365 A1 | 11/2015 | Aoki et al. |

FOREIGN PATENT DOCUMENTS

| | | |
|---|---|---|
| JP | 11-166084 A | 6/1999 |
| JP | 2004-130528 A | 4/2004 |
| JP | 2005-060678 A | 3/2005 |
| JP | 2008-179785 A | 8/2008 |
| JP | 2009-149823 A | 7/2009 |
| JP | 2009-185121 A | 8/2009 |
| JP | 2009-196236 A | 9/2009 |
| JP | 2010-513634 A | 4/2010 |
| JP | 2013-067789 A | 4/2013 |
| JP | 2014-132073 A | 7/2014 |
| WO | WO-2014/046086 A1 | 3/2014 |

OTHER PUBLICATIONS

International Search Report and Written Opinion issued PCT/JP2017/017577, dated Aug. 8, 2017, 15 pages (with translation).

* cited by examiner

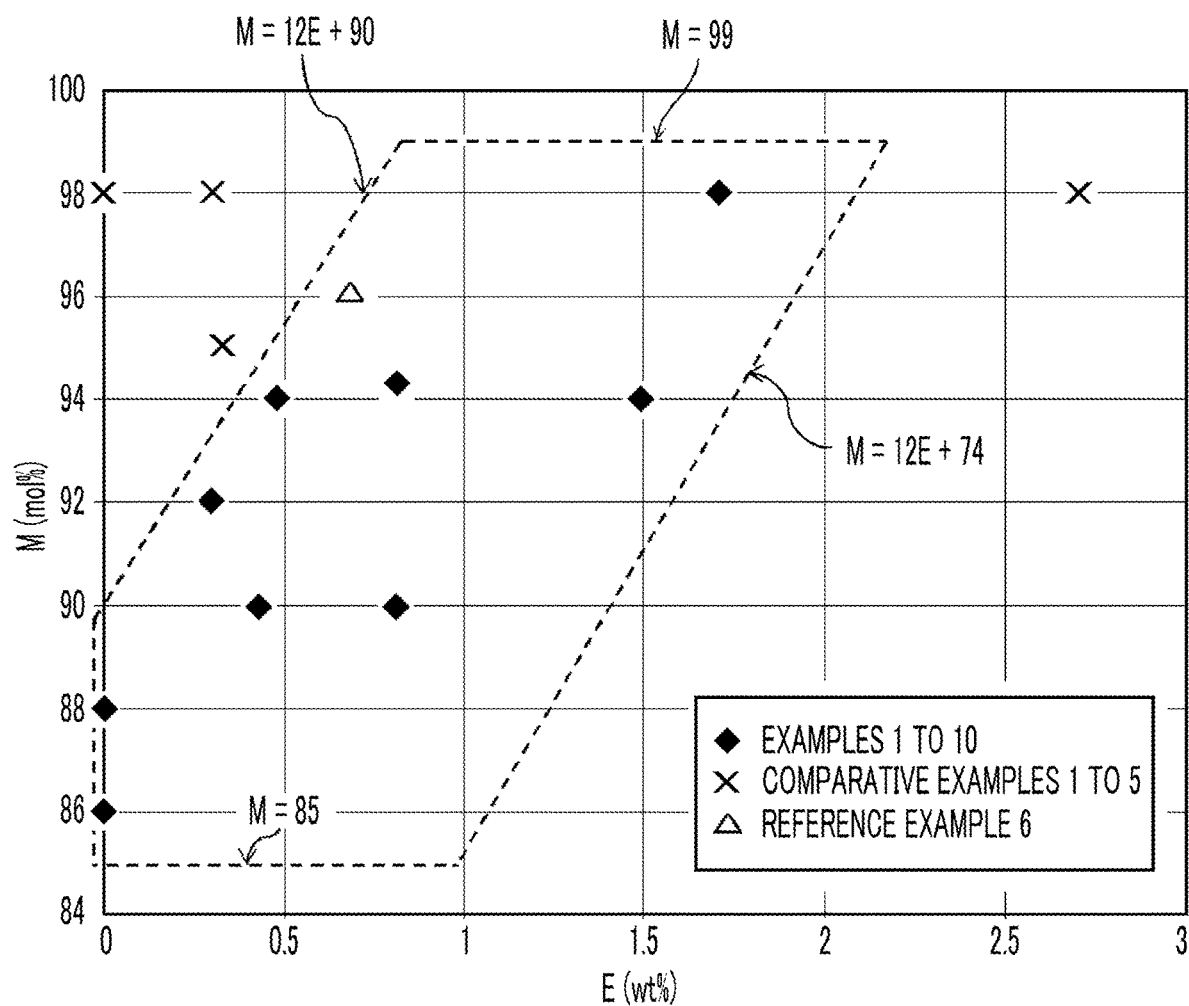

FIBER-REINFORCED POLYPROPYLENE-BASED RESIN COMPOSITION AND MOLDED PRODUCT THEREOF

CROSS-REFERENCE TO RELATED APPLICATIONS

This is a U.S. National Phase of International Application No. PCT/JP2017/017577 filed on May 9, 2017, which claims priority to Japanese Application No. 2016-094511 filed on May 10, 2016. The contents of these applications are hereby incorporated by reference in their entirety.

BACKGROUND

The present disclosure relates to a fiber-reinforced polypropylene-based resin composition with which a molded product having excellent heat resistance and mechanical characteristics and having an excellent external appearance of a molded product surface (particularly, external appearance of a grained surface) can be produced.

Since fiber-reinforced resin molded products are lightweight and have excellent rigidity and heat resistance, fiber-reinforced resin molded products are utilized in various fields such as electrical appliances, automobiles, housing equipment, and medical instruments.

Regarding the fiber-reinforced resin molded products, for example, molded products formed by using reinforcing fibers such as glass fibers and a thermoplastic resin such as polyamide or polypropylene are known. Such fiber-reinforced resin molded products are utilized, in the field of automobiles, as members that are required to have high rigidity and heat resistance, such as a fan shroud or a propeller fan in the engine room. However, in a case in which a fiber-reinforced polypropylene-based resin composition that uses reinforcing fibers such as glass fibers is molded, surface unevenness caused by floating of the reinforcing fibers occurs at the surface of a molded product thus obtainable, and the external appearance becomes poor. Therefore, it is difficult to utilize such a fiber-reinforced polypropylene-based resin composition for, for example, an automotive interior material where designability is required, such as an automobile instrumental panel, particularly an automotive interior material where a fine concavo-convex surface (grained surface) is formed on the surface in order to give a luxurious feel made by matting.

In order to improve the external appearance of fiber-reinforced polypropylene-based resin molded products, it has been suggested to add a polypropylene resin having a particular structure (JP 2005-60678, JP 2013-67789, JP 2014-132073). However, even if such a polypropylene resin is added, the surface appearance improving effect is low, and the mechanical strength tends to decrease.

Furthermore, it has also been suggested to improve the external appearance of a fiber-reinforced polypropylene-based resin molded product by a special molding method (JP 2004-130528 and JP 2009-196236). However, even if this molding method is used, when the fiber content is more than 30% by mass, the external appearance improving effect is not satisfactory. Furthermore, this molding method requires complicated and high-cost processes and production facilities, and thus, the cost-effective superiority of polypropylene resins is impaired.

SUMMARY

An object of the present disclosure is to provide a fiber-reinforced polypropylene-based resin composition with which a molded product having excellent heat resistance and mechanical characteristics and having an excellent external appearance of the molded product surface (particularly, external appearance of a grained surface) can be produced, and to provide a molded product obtainable from this composition.

Solution to Problem

The inventors of the present disclosure conducted a thorough investigation in order to solve the problems described above, and as a result, the inventors found that when a relation between a content of at least one olefin-derived structural unit selected from ethylene and an α-olefin having 4 to 8 carbon atoms in a propylene-based polymer and stereoregularity (mmmm) is adjusted to be in a particular range, and a content of reinforcing fibers (B) is set to be in a particular range, the heat resistance and mechanical characteristic of the molded product and the external appearance of the molded product surface can be enhanced in a well-balanced manner. Thus, the inventors completed the present disclosure.

That is, the gist of the present disclosure lies in the following.

[1] A fiber-reinforced polypropylene-based resin composition comprising a propylene-based polymer (A) and reinforcing fibers (B), wherein in a case in which a content of at least one olefin-derived structural unit selected from ethylene and an α-olefin having 4 to 8 carbon atoms in the propylene-based polymer (A) is designated as E (% by mass) (the sum of the propylene-based polymer (A) and the reinforcing fibers (B) is designated as 100% by mass), and a mesopentad fraction of the propylene-based polymer (A) measured by $^{13}$C-NMR is designated as M (%), the following Expression (1) and Expression (2) are satisfied.

$$85 \leq M \leq 99 \quad (1)$$

$$74 \leq M - 12E \leq 90 \quad (2)$$

[2] The fiber-reinforced polypropylene-based resin composition according to [1], wherein an amount G (parts by mass) of the reinforcing fibers (B) satisfies the following Expression (3).

$$(1/200)[3100 + 95 \times (100 - M) + 590 \times E] \leq G \leq 60 \quad (3)$$

[3] The fiber-reinforced polypropylene-based resin composition according to [1], wherein the reinforcing fibers (B) are glass fibers.

[4] The fiber-reinforced polypropylene-based resin composition according to [1], wherein the propylene-based polymer (A) is a blend including a propylene-based polymer with high stereoregularity (A1) having a mesopentad fraction (M) that is equal to or more than 90% and equal to or less than 99.9% and a propylene-based polymer with low stereoregularity (A2) having a mesopentad fraction (M) that is equal to or more than 50% and less than 90%.

[5] The fiber-reinforced polypropylene-based resin composition according to [1], further comprising one or more components selected from the group consisting of a modified polypropylene (C), an impact resistance-improving agent (D), and a phenolic oxidation inhibitor and/or a sulfur-based oxidation inhibitor (F'), in a total amount of 0.01 to 40 parts by mass with respect to 100 parts by mass of the sum of the propylene-based polymer (A) and the reinforcing fibers (B).

[6] A molded product formed by molding the fiber-reinforced polypropylene-based resin composition according to [1].

[7] The molded product according to [6], which is formed by injection molding the fiber-reinforced polypropylene-based resin composition.

[8] The molded product according to [6], which has a grained surface.

[9] The molded product according to [6], which is a molded product for an automotive interior or exterior part or an electrical appliance part.

According to the present disclosure, a fiber-reinforced polypropylene-based resin composition with which a molded product having excellent heat resistance and mechanical characteristics and having excellent external appearance of the molded product surface (particularly, external appearance of a grained surface) can be produced, and a molded product obtainable from this composition can be provided.

BRIEF DESCRIPTION OF THE DRAWINGS

The FIGURE is a graph showing a relation between a content (E) of at least one olefin-derived structural unit selected from ethylene and an α-olefin having 4 to 8 carbon atoms and a mesopentad fraction (M) for components (A) of examples and comparative examples.

DETAILED DESCRIPTION

<Propylene-Based Polymer (A)>

According to the present disclosure, the propylene-based polymer (A) is a polymer containing a propylene-derived structural unit as a main structural unit. The propylene-based polymer (A) may be a propylene homopolymer or may be a copolymer made of propylene and at least one olefin selected from ethylene and an α-olefin having 4 to 8 carbon atoms. Particularly, a propylene homopolymer and a propylene-ethylene random copolymer are preferred. The content of a propylene-derived structural unit in the propylene-based polymer (A) is preferably equal to or more than 97.9 mol % and more preferably equal to or more than 98.2 mol %.

The melt flow rate of the propylene-based polymer (A) measured at 230° C. under a load of 2.16 kg according to ASTM D1238 is preferably 5 to 300 g/10 minutes, more preferably 10 to 250 g/10 minutes, and particularly preferably 20 to 200 g/10 minutes. In a case in which the melt flow rate is equal to or higher than 5 g/10 minutes, for example, problems attributed to the resin fluidity, such as that when a large-sized molded product such as an instrument panel or a door trim is molded, the resin does not fill fine parts of a mold, are not likely to occur. Furthermore, in a case in which the melt flow rate is equal to or lower than 300 g/10 minutes, characteristics such as impact resistance of the molded product tend to improve.

The content (E) of at least one olefin-derived structural unit selected from ethylene and an α-olefin having 4 to 8 carbon atoms in the propylene-based polymer (A) is preferably not 0% by mass, and more preferably equal to or more than 0.2% by mass. Furthermore, the content (E) is usually 0.2% to 2.1% by mass, preferably 0.2% to 2.0% by mass, more preferably 0.2% to 1.8% by mass, particularly preferably 0.5% to 1.5% by mass, and most preferably 0.8% to 1.2% by mass. Here, the sum of the propylene-based polymer (A) and the reinforcing fibers (B) is designated as 100% by mass. This content (E) can be measured by infrared spectroscopy and NMR. When this content (E) is not 0% by mass, the external appearance of the molded product surface tends to be enhanced. Furthermore, by adjusting both the content (E) and the mesopentad fraction (M), the heat resistance and mechanical characteristics of the molded product and the external appearance of the molded product surface can be enhanced in a well-balanced manner. When this content (E) is equal to or less than 2.1% by mass, a decrease in the mechanical strength of the molded product tends to be suppressed.

The propylene-based polymer (A) satisfies the following Expression (1) in connection with the mesopentad fraction (M) (%) measured by $^{13}$C-NMR, and the propylene-based polymer (A) preferably satisfies the following Expression (1'), and more preferably the following Expression (1"):

$$85 \leq M \leq 99 \tag{1}$$

$$87 \leq M \leq 98 \tag{1'}$$

$$90 \leq M \leq 96 \tag{1"}$$

The mesopentad fraction (M) is an indicator representing stereoregularity (mmmm) of the propylene-based polymer (A), and as this value is larger, it is implied that the propylene-based polymer (A) has higher stereoregularity (mmmm). The method for measuring the mesopentad fraction (M) will be explained in the examples described below.

The propylene-based polymer (A) satisfies the following Expression (2), and preferably the following Expression (2'), in relation to the content (E) (% by mass) of at least one olefin-derived structural unit selected from ethylene and an α-olefin having 4 to 8 carbon atoms and the mesopentad fraction (M) (%):

$$74 \leq M - 12E \leq 90 \tag{2}$$

$$76 \leq M - 12E \leq 88 \tag{2'}$$

When the propylene-based polymer (A) satisfies the respective above-described expressions, a molded product obtainable from the resin composition of the present disclosure that is reinforced with a particular amount of reinforcing fibers (B) exhibits an effect that an excellent balance is achieved between mechanical characteristics, heat resistance, and external appearance. It is speculated that when the various expressions are satisfied, the rate of crystallization is appropriately controlled, mold transferability is enhanced while rigidity is retained, so that fibers do not float to the surface, and therefore, the molded product has an excellent external appearance.

The type of the propylene-based polymer (A) is not particularly limited; however, it is preferable that the propylene-based polymer (A) is an isotactic propylene-based polymer and/or an atactic propylene-based polymer. The propylene-based polymer (A) may be a polymer of a single kind, or may be a blend of multiple kinds of polymers. In a case in which the propylene-based polymer (A) is a blend of multiple kinds of polymers, it is preferable that the propylene-based polymer (A) includes a polypropylene-based polymer having a mesopentad fraction (M) that is equal to or more than 50% at a proportion equal to or more than 83% by mass (the total amount of the propylene-based polymer (A) is designated as 100% by mass).

Regarding the propylene-based polymer (A), it is preferable to use a blend including a propylene-based polymer with high stereoregularity (A1) and a propylene-based polymer with low stereoregularity (A2), from the viewpoint that the content (E) (% by mass) of at least one olefin-derived structural unit selected from ethylene and an α-olefin having 4 to 8 carbon atoms and the mesopentad fraction (M) (%) can be easily adjusted so as to satisfy the various expressions described above, that is, from the viewpoint that the degree of freedom for quality adjustment is high. The mesopentad fraction (M) of the propylene-based polymer with high stereoregularity (A1) is usually equal to or more than 90% and equal to or less than 99.9%, and preferably equal to or more than 95% and equal to or less than 99.5%. The mesopentad fraction (M) of the propylene-based polymer with low stereoregularity (A2) is usually equal to or more than 50% and less than 90%, and preferably equal to or more than 60% and equal to or less than 80%.

It is preferable that at least one of the propylene-based polymer with high stereoregularity (A1) and the propylene-based polymer with low stereoregularity (A2), and preferably the propylene-based polymer with high stereoregularity (A1), includes at least one olefin-derived structural unit selected from ethylene and an α-olefin having 4 to 8 carbon atoms. For example, in a case in which the propylene-based polymer with high stereoregularity (A1) includes at least one olefin-derived structural unit selected from ethylene and an α-olefin having 4 to 8 carbon atoms, the content of the structural unit is preferably 0.2% to 8% by mass, and more preferably 0.2% to 6% by mass (the total amount of the propylene-based polymer with high stereoregularity (A1) is designated as 100% by mass). The preferred content in the case in which the propylene-based polymer with low stereoregularity (A2) includes the structural unit, is also similar. It is also acceptable to use a blend including multiple kinds of propylene-based polymers with high stereoregularity (A1) and/or multiple kinds of propylene-based polymers with low stereoregularity (A2).

Regarding the propylene-based polymer with high stereoregularity (A1), a commercially available propylene homopolymer may be used as received, or a propylene-based polymer obtainable by the methods of using a titanium catalyst or a metallocene catalyst as described in, for example, Japanese Patent Application Laid-Open No. 7-196734, Japanese Patent Application Laid-Open No. 11-71431, Japanese Patent Application Laid-Open No. 2002-249624, and WO 2005/019283, may be used. Furthermore, the propylene-based polymer with high stereoregularity (A1) may have its fluidity regulated by treating the polymer using an organic peroxide.

Regarding the polypropylene with low stereoregularity (A2), a commercially available product may be used as received, or a propylene-based polymer obtainable by a method of using a titanium catalyst in the co-presence of a particular alkoxy-containing compound (for example, Example 1 of Japanese Patent Application Laid-Open No. 10-101866) or a method of using a particular metallocene compound (for example, WO 2003/91289) may be used. Furthermore, the polypropylene with low stereoregularity (A2) may have its fluidity regulated by treating the polymer using an organic peroxide.

The method for producing the propylene-based polymer (A) is not particularly limited. For example, by appropriately blending a propylene-based polymer with high stereoregularity (A1) and a propylene-based polymer with low stereoregularity (A2), the content (E) (% by mass) of at least one olefin-derived structural unit selected from ethylene and an α-olefin having 4 to 8 carbon atoms and the mesopentad fraction (M) (%) of the entirety of the propylene-based polymers (A) are regulated, and thus a propylene-based polymer (A) as a blend that satisfies the various expressions described above is obtained.

<Reinforcing Fibers (B)>

According to the present disclosure, examples of the reinforcing fibers (B) include carbon fibers, carbon nanotubes, basic magnesium sulfate fibers (magnesium oxysulfate fibers), potassium titanate fibers, aluminum borate fibers, calcium silicate fibers, calcium carbonate fibers, glass fibers, silicon carbide fibers, wollastonite, xonotlite, metal fibers; natural fibers of cotton, celluloses, silk, wool, hemp, and the like; regenerated fibers such as rayon, Cupro, and the like; semisynthetic fibers of acetate, promix, and the like; synthetic fibers of polyester, polyacrylonitrile, polyamide, aramid, polyolefin, and the like; and modified fibers having the surface and terminals of those fibers chemically modified. Since rigidity is dependent on the content E (% by mass) of at least one olefin-derived structural unit selected from ethylene and an α-olefin having 4 to 8 carbon atoms and the mesopentad fraction M (%) representing stereoregularity, of the propylene-based resin (A) in addition to the amount of fibers, it is preferable that the amount G (parts by mass) of the reinforcing fibers (B) satisfies the following expression (3) in order to obtain high rigidity. Furthermore, in order to obtain a molded product having an excellent external appearance, it is preferable that the amount of the reinforcing fibers (B) is equal to or less than 60 parts by mass. The amount of the reinforcing fibers is more preferably such that $20 \leq G \leq 60$, and particularly preferably $25 \leq G \leq 60$ (based on 100 parts by mass of the total amount of the propylene-based resin (A) and the reinforcing fibers (B))

$$(1/200)[3100+95\times(100-M)+590\times E] \leq G \leq 60 \quad (3)$$

Among the various fibers described above, celluloses such as nanocellulose and TEMPO-oxidized nanocellulose; glass fibers; carbon fibers; and carbon nanotubes such as single-walled carbon nanotubes and multi-walled carbon nanotubes are preferred from the viewpoint that the effect of enhancing the various performances such as molding appearance, physical properties balance, and dimensional stability (decrease in the coefficient of linear expansion) of the resin composition and the molded product is high. Particularly, glass fibers, carbon fibers, and celluloses are more preferred from the viewpoint that those fibers are useful for general purposes, easily available, and inexpensive. Particularly, glass fibers are most preferred.

Regarding the form of the reinforcing fibers (B), chopped strands are preferred. Chopped strands usually have a length of 1 to 10 mm and a fiber diameter of 5 to 20 μm, and preferably have a length of 1.5 to 6 mm and a fiber diameter of 8 to 14 μm. Regarding another form, continuous fiber bundles can also be used. Continuous fiber bundles are commercially available as, for example, roving. The fiber diameter is usually 5 to 30 μm, and preferably 13 to 20 μm.

The reinforcing fibers (B) may be surface-treated with an organic titanate-based coupling agent, an organic silane coupling agent, or a treating agent such as a modified polyolefin grafted with an unsaturated carboxylic acid or an anhydride thereof, a fatty acid, a fatty acid metal salt, or a fatty acid ester, in order to improve the adhesiveness to the propylene-based polymer (A) or to improve dispersibility in the resin composition. Furthermore, the reinforcing fibers (B) may have the surface treated with a thermosetting or thermoplastic resin component.

Regarding the reinforcing fibers (B), only one kind of reinforcing fibers may be used, or two or more kinds of reinforcing fibers may be used in combination.

<Modified Polypropylene (C)>

The fiber-reinforced polypropylene-based resin composition of the present disclosure may further include a modified polypropylene (C). The modified polypropylene (C) may be obtained by modifying polypropylene with an acid. Regarding the modification method, for example, graft modification or copolymerization is available.

Regarding the modifying agent used for modification, unsaturated carboxylic acids and derivatives thereof are available. Specific examples of the unsaturated carboxylic acids include acrylic acid, methacrylic acid, maleic acid, nadic acid, fumaric acid, itaconic acid, crotonic acid, citraconic acid, sorbic acid, mesaconic acid, angelic acid, and phthalic acid. Examples of the derivatives of unsaturated carboxylic acids include acid anhydride, ester, amide, imide, and a metal salt. Specific examples thereof include maleic anhydride, itaconic anhydride, citraconic anhydride, nadic anhydride, phthalic anhydride, methyl acrylate, methyl methacrylate, ethyl acrylate, butyl acrylate, maleic acid monoethyl ester, acrylamide, maleic acid monoamide, maleimide, N-butylmaleimide, sodium acrylate, and sodium methacrylate. Among them, unsaturated dicarboxylic acids and derivatives thereof are preferred, and maleic anhydride and phthalic anhydride are more preferred.

In a case in which acid modification is carried out during a process of melt kneading, for example, polypropylene and an unsaturated carboxylic acid or a derivative thereof are kneaded in an extruder together with an organic peroxide, and thereby the polypropylene is modified by graft-copolymerizing the unsaturated carboxylic acid or a derivative thereof into the polypropylene.

Specific examples of the organic peroxide include benzoyl peroxide, lauroyl peroxide, azobisisobutyronitrile, dicumyl peroxide, t-butyl hydroperoxide, α,α'-bis(t-butylperoxydiisopropyl)benzene, bis(t-butyldioxyisopropyl)benzene, 2,5-dimethyl-2,5-di(t-butylperoxy)hexane, 2,5-dimethyl-2,5-di(t-butylperoxy)hexyne-3, di-t-butyl peroxide, and cumene hydroperoxide.

The modified polypropylene (C) is preferably an anhydrous fatty acid-modified polypropylene, and more preferably a maleic anhydride-modified polypropylene, from the viewpoint of improving the affinity between the reinforcing fibers (B) and the propylene-based polymer (A) and enhancing the strength or heat resistance.

In the case of using a maleic anhydride-modified polypropylene as the modified polypropylene (C), the amount of use of the maleic anhydride-modified polypropylene is preferably 0.5 to 5.0 parts by mass, and more preferably 0.8 to 3.0 parts by mass, with respect to 100 parts by mass of the fiber-reinforced polypropylene-based resin composition. In a case in which the amount of use is smaller than this range, the effect of enhancing the mechanical characteristics of the molded product may not be recognized. On the other hand, in a case in which the amount of use is larger than this range, the impact strength among the mechanical characteristics of the molded product may be deteriorated.

The intrinsic viscosity [η] of the polypropylene that serves as a base of the modified polypropylene (C), as measured in decalin at 135° C., is usually 0.2 to 2.0 dl/g, and preferably 0.4 to 1.0 dl/g.

Regarding the maleic anhydride-modified polypropylene, specifically, commercially available products such as ADMER (registered trademark) manufactured by Mitsui Chemicals, Inc., UMEX (registered trademark) manufactured by Sanyo Chemical Industries, Ltd., MZ series manufactured by DuPont Company, EXXELOR (registered trademark) manufactured by Exxon Mobil Corporation, and trade name: POLYBOND 3200 manufactured by Addivant Japan GK, can be used.

<Impact Resistance-Improving Agent (D)>

The fiber-reinforced polypropylene-based resin composition of the present disclosure may include an impact resistance-improving agent (D) as necessary. The type of the impact resistance-improving agent (D) is not particularly limited; however, an ethylene-based polymer and a styrene-based block copolymer are preferred.

Regarding the ethylene-based polymer, an ethylene homopolymer or an ethylene-α-olefin copolymer can be used. An ethylene-α-olefin copolymer is obtained by, for example, copolymerizing ethylene with one or more α-olefins selected from α-olefins having 3 to 10 carbon atoms. Preferred examples of the α-olefins include propylene, 1-butene, 1-hexene, and 1-octene. The α-olefins may be used singly, or two or more kinds thereof may be used as a mixture.

The melt flow rate of the ethylene-based polymer measured at 230° C. under a load of 2.16 kg according to ASTM D1238 is preferably 0.1 to 40 g/10 minutes, more preferably 1 to 20 g/10 minutes, and particularly preferably 1 to 10 g/10 minutes. When the melt flow rate is equal to or higher than 0.1 g/10 minutes, a decrease in the resin fluidity or defective dispersion at the time of kneading is not likely to occur, and the physical properties such as impact resistance of the molded product are not likely to be deteriorated. On the other hand, when the melt flow rate is equal to or lower than 40 g/10 minutes, the molded product tends to acquire sufficient impact resistance.

The percentage content of the α-olefin-derived structural unit with respect to all of the structural units in the copolymer of the ethylene-α-olefin copolymer is preferably 5 mol % to 60 mol %, more preferably 7 mol % to 50 mol %, and particularly preferably 10 mol % to 45 mol %. The ethylene-α-olefin copolymer is particularly preferably an ethylene-octene copolymer or an ethylene-butene copolymer.

Regarding the styrene-based block copolymer, for example, a styrene-conjugated diene type diblock copolymer or a styrene-conjugated diene-styrene triblock copolymer can be used. In addition to those, an X-Y-Y' type triblock copolymer that uses a block Y', in which the amount of vinyl bonds of a conjugated diene has been decreased in order to increase fluidity, can also be used. Regarding a hydrogenation product of a block copolymer, an X-Y-X type triblock copolymer is particularly preferred.

In regard to the styrene-based block copolymer, the styrene content is preferably 10% to 25% by mass, and the MFR (ASTM D-1238, 190° C., under a load of 2.16 kg) is preferably 0.5 to 15 g/10 minutes, and more preferably 1 to 10 g/10 minutes.

Specific examples of the styrene-based block copolymer include a styrene-ethylene-butene-styrene block copolymer, a styrene-ethylene-propylene-styrene block copolymer, and a styrene-ethylene-propylene block copolymer.

<Other Components (F)>

In the fiber-reinforced polypropylene-based resin composition of the present disclosure, if necessary, additives such as a heat stabilizer, an antistatic agent, a weathering stabilizer, a light stabilizer, an aging preventing agent, an oxidation inhibitor, a copper inhibitor, a fatty acid metal salt, a softening agent, a dispersant, a filler, a colorant, a pigment, and a foaming agent can be incorporated to the extent that does not impair the purpose of the present disclosure. The order of mixing of the additives is arbitrary, and the additives may be mixed simultaneously, or a multi-stage mixing method of mixing some components and then mixing other components can also be used. Among them, it is preferable to incorporate a phenolic oxidation inhibitor and/or a sulfur-based oxidation inhibitor (F').

<Fiber-Reinforced Polypropylene-Based Resin Composition>

The fiber-reinforced polypropylene-based resin composition of the present disclosure is a composition including a propylene-based polymer (A) and reinforcing fibers (B) as essential components. When the sum of the propylene-based polymer (A) and the reinforcing fibers (B) is designated as 100% by mass, it is preferable that the amount G (parts by mass) of the reinforcing fibers (B) satisfies the following Expression (3):

$$(1/200)[3100+95\times(100-M)+590\times E] \leq G \leq 60 \quad (3)$$

When the amount G of the reinforcing fibers (B) is less than $(1/200)[3100+95\times(100-M)+590\times E]$, the mechanical strength or the deflection temperature under load of the molded product may not be effectively exhibited. Furthermore, when this amount G is more than 60 parts by mass, a defective external appearance in which the fibers float to the molded product surface may occur. The amount of the reinforcing fibers (B) is more preferably such that $20 \leq G \leq 60$, and particularly preferably such that $25 \leq G \leq 60$.

In a case in which the fiber-reinforced polypropylene-based resin composition of the present disclosure includes components other than the propylene-based polymer (A) and the reinforcing fibers (B), it is preferable that the resin composition includes one or more components selected from the group consisting of a modified polypropylene (C), an impact resistance-improving agent (D), and a phenolic oxidation inhibitor and/or a sulfur-based oxidation inhibitor (F') in a total amount of 0.01 to 40 parts by mass, and more preferably 0.1 to 35 parts by mass, with respect to 100 parts by mass of the sum of the propylene-based polymer (A) and the reinforcing fibers (B). The amount of the modified polypropylene (C) is preferably 0.1 to 3 parts by mass. The amount of the impact resistance-improving agent (D) is preferably 0.1 to 30 parts by mass. The amount of the phenolic oxidation inhibitor and/or sulfur-based oxidation inhibitor (F') is preferably 0.01 to 3 parts by mass.

The fiber-reinforced polypropylene-based resin composition of the present disclosure can be produced by mixing the component (A) and component (B) described above, and optionally the component (C), component (D), and component (F). The order of mixing of the various components is arbitrary. For example, a pellet of the fiber-reinforced propylene-based resin composition can be obtained by mixing or melt-kneading the various components using a mixing apparatus.

Pellets of the fiber-reinforced polypropylene-based resin composition include short fiber pellets and long fiber pellets. Short fiber pellets can be produced by a known method such as, for example, a method of melt-kneading portions or entireties of the various components described above in a single-screw or twin-screw extruder. Long fiber pellets can be produced by a known method such as a drawing method. Some of the components are separately melt-kneaded, subsequently the resultant is blended with other components, and the blend may be used.

In regard to the long fiber pellets, since the length of the fibers in the composition is long, the strength or heat resistance of the composition tends to increase, and more remarkable effects are obtained. The pellet length of the long fiber pellets is usually 2 to 50 mm. When the pellet length is appropriately long, the rigidity, heat resistance, and strength tend to increase. However, if the pellet length is too long, molding may become difficult. The pellet length is preferably 3 to 25 mm, and more preferably 6 to 12 mm.

In a case in which a molded product is produced using pellets of the fiber-reinforced polypropylene-based resin composition of the present disclosure, molding may be performed using the pellets alone, or molding may be performed using a blend of the pellets and a diluent material (for example, a material made of a composition other than the resin composition of the present disclosure, such as polypropylene). This blend may be a blend obtained by a dry blending method. Rather, in order to maintain the fiber length in the composition and to exhibit higher rigidity, heat resistance, and strength, it is preferable that after dry blending, the blend is provided directly to a molding machine such as an injection molding machine without being subjected to an extruder. The diluent material may be any material made of the polypropylene resin (A) or the impact resistance-improving agent (D) explained above. It is also acceptable that a master batch of a resin including components such as a pigment, additives, and a foaming agent is blended with pellets of the fiber-reinforced polypropylene-based resin composition of the present disclosure, and the blend is used.

The fiber-reinforced polypropylene-based resin composition of the present disclosure can be used for known molding methods, and the resin composition is suitably used for injection molding in particular. A molded product formed by injection molding the fiber-reinforced polypropylene-based resin composition of the present disclosure has excellent thermal and mechanical characteristics and has an excellent external appearance of the molded product surface. Particularly, in a case in which a molded product having a grained surface is injection molded, a molded product having an excellent external appearance of a grained surface and having a luxurious feel made by matting is obtained. Therefore, for use applications where designability is required, the molded product of the present disclosure is particularly useful.

Such a fiber-reinforced polypropylene-based resin composition of the present disclosure can be suitably used in various fields such as automotive interior and exterior parts and electrical appliance parts.

EXAMPLES

Hereinafter, the present disclosure will be explained more specifically based on examples. However, the present disclosure is not intended to be limited to these examples.

The measurement methods related to the polymer components used in examples and comparative examples, and the evaluation methods for molded products are as follows.

(1) Measurement of melt flow rate (MFR): According to ASTM D1238, the melt flow rate (MFR) was measured, unless particularly stated otherwise, under the conditions of a load of 2.16 kg and 230° C.

(2) Measurement of content (E) of at least one olefin-derived structural unit selected from ethylene and an α-olefin having 4 to 8 carbon atoms: The content (E) of at least one olefin-derived structural unit selected from ethylene and an α-olefin having 4 to 8 carbon atoms in the propylene-based polymer (A) was measured by Fourier transform infrared spectrometry (FT-IR) [more particularly, by calculation from calibration curves for the ethylene content based on NMR and the ethylene content based on FT-IR]. Particularly, in a case in which a blend of two or more kinds of propylene-based polymers was used as the propylene-based polymer (A), calculation was performed by assuming that the content (E) of at least one olefin-derived structural unit selected from ethylene and an α-olefin having 4 to 8 carbon atoms as measured for each propylene-based polymer was subjected to additivity. That is, in a case in which the blend was composed of n kinds of propylene-based polymers in total, the mass ratio occupied by the i-th polymer in the total amount of the blend was designated as $w_i$, and the content of at least one olefin-derived structural unit selected from ethylene and an α-olefin having 4 to 8 carbon atoms was designated as $E_i$ (% by mass), the content (% by mass) of the at least one olefin-derived structural unit selected from ethylene and an α-olefin having 4 to 8 carbon atoms in the blend was determined by the following Expression. Meanwhile, the NMR analysis was carried out by a conventional method, for example, according to the method described in Japanese Patent Application Laid-Open No. 2014-132073. Then, the content was calculated relative to the sum of the propylene-based polymer (A) and the reinforcing fibers (B) of this blend as 100% by mass, and this was designated as the content E (% by mass) of that structural unit.

$$E = \Sigma_{i=1}^{n}(w_i \times E_i)$$

(3) Measurement of mesopentad fraction (M): A $^{13}$C-NMR spectrum of the propylene-based polymer (A) was obtained by an NMR analysis, and thereby the mesopentad fraction (M) was calculated. Specifically, 50 mg of a sample was dissolved in 0.6 ml of a 4/1 mixed solvent of o-dichlorobenzene and deuterated benzene (o-dichlorobenzene/deuterated benzene, volume ratio), and a $^{13}$C-NMR spectrum was measured using A500 type nuclear magnetic resonance apparatus manufactured by JEOL, Ltd. under the conditions of 120° C., a 45°-pulse, a repetition time of 5.5 seconds, and a cumulative frequency of 16,000 times. The reference value for the chemical shift was set to the signal originating from the mmmm pentad of a methyl group, 21.59 ppm. Then, the 2,1-bond amount: F(2,1)×100 (mol %), the 1,3-bond amount: F(1,3)×100 (mol %), and the mesopentad fraction (M): F (mmmm)×100(%) were respectively calculated by the following Expressions. A value of less than 0.01% was considered to be undetectable.

$$F(2, 1) = \frac{[\{I(R1) + I(R2)\} \div 2]}{[I(CH3) + I(R1) + I(R2) + \{I(A1) + I(A3)\} \div 2 + \{I(C1) + I(C3)\} \div 2]}$$

$$F(1, 3) = \frac{[\{I(S1) + I(S2)\} \div 4]}{[I(CH3) + \{I(S1) + I(S2)\} \div 4]}$$

$$F(mmmm) = \frac{I(mmmm)}{[I(mmm) + I(ummr) + I(rmmr) + I(mmrr) + I(rmrr) + I(rmrm) + I(mmrm) + I(rrrr) + I(mrrr) + I(A1) - I(A3) - [I(C1) + I(C2)\} \div 2 + I(mrrm)]}$$

The meanings of the symbols in the respective formulae are as follows. I (X) represents the peak area originating from methyl groups at 19 to 22 ppm assigned to X. I (CH$_3$) represents the total peak area originating from methyl groups at 19 to 22 ppm. R1 and R2 represent peaks for the following structure (R) assigned to the 2,1-insertion. The following assignment relates to the erythro-form; however, calculation can also be similarly carried out for the case of threo-form. S1 and S2 represent peaks for the following structure (S) assigned to the 1,3-insertion. A1, A3, C1, C2, and C3 represent peaks assigned to the following structures (A and C) at the polymer terminals.

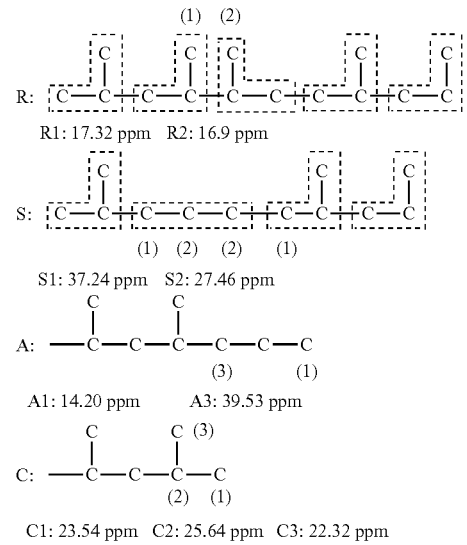

Peaks other than those were assigned by referring to A. Zambelli, D. E. Dorman, A. I. Richard Brewster, and F. A. Bovey, Macromolecules, Vol. 6, No. 6, 925 (1973).

Particularly, in the case of using a blend of two or more kinds of propylene-based polymers as the propylene-based polymer (A), calculation was performed by assuming that the mesopentad fractions (M) measured for the respective propylene-based polymers were subjected to additivity. That is, in a case in which the blend was composed of n kinds of propylene-based polymers in total, the mass ratio occupied by the i-th polymer in the total amount of the blend was designated as $w_i$, and stereoregularity (mmmm), namely, the mesopentad fraction was designated as Mi (%), the mesopentad fraction (M) (%) of the blend was determined by the following Expression.

$$M(mmmm) = \sum_{i=1}^{n}(w_i \times M_i(mmmm))$$

(4) Measurement of tensile stress at break: The tensile stress at break was measured according to ISO 527 under the conditions of a tensile rate of 5 mm/min.

(5) Measurement of flexural modulus: The flexural modulus was measured according to ISO 178.

(6) Measurement of deflection temperature under load:

The deflection temperature under load (DTUL) was measured according to ISO 75 under a load of 1.8 MPa.

(7) Evaluation of external appearance: An automotive interior specimen having a grained surface, the specimen having a size of 120 mm×130 mm×2 mm, was obtained by injection molding. Specifically, 2 parts by mass of a carbon black 30% master batch (manufactured by ToyoColor Co., Ltd., trade name: PPM-01143) was dry-blended with 100 parts by mass of one of the compositions of examples and comparative examples, and the blend was injection-molded to obtain a black-colored specimen. The specimen was colored black as such in order to make the floating of glass fibers on the surface of the specimen easily recognizable. The state of floating of glass fibers at the specimen surface was determined by visual inspection according to the following criteria.

"A": No glass fibers are recognized at the grained surface.
"B": Glass fibers are almost not recognized at the grained surface.
"C": Some glass fibers are recognized at the grained surface.
"D": Glass fibers are clearly recognized at the grained surface.

The various components used in examples and comparative examples were as follows.

<Propylene-Based Polymer (A)>
The following three kinds of propylene-based polymers owned by Prime Polymer Co., Ltd., PP-1, PP-2, and PP-3, were used.
"PP-1": Propylene homopolymer, MFR=60 g/10 min, mesopentad fraction (M)=98% (high stereoregularity)
"PP-2": Propylene-ethylene random copolymer, MFR=60 g/10 min, mesopentad fraction (M)=98% (high stereoregularity), content of an ethylene-derived structural unit=2.7% by mass
"PP-3": Propylene homopolymer, MFR=60 g/10 min, mesopentad fraction (M)=70% (low stereoregularity)

<Reinforcing Fibers (B)>
"T-480": Glass fibers manufactured by Nippon Electric Glass Co., Ltd. (trade name T-480)

<Modified Polypropylene (C)>
"Polybond3200": Maleic anhydride-modified polypropylene manufactured by Addivant Japan GK, trade name POLYBOND 3200, MFR (190° C., 2.16 kg)=115 g/10 min <Other Components (F')>
"Irg1010": Phenolic oxidation inhibitor manufactured by BASF SE, IRGANOX (registered trademark) 1010
"DMTP": Sulfur-based oxidation inhibitor manufactured by Mitsubishi Chemical Corp.

Examples 1 to 10, Comparative Examples 1 to 5, Reference Example 1

Three kinds of propylene-based polymers, PP-1, PP-2, and PP-3, were used singly, or two or more kinds thereof were mixed at various ratios, and thereby components (A) were prepared as single substances or as blends, each having the mesopentad fraction (M) and the content (E) of at least one olefin-derived structural unit selected from ethylene and an α-olefin having 4 to 8 carbon atoms as indicated in Table 1 and Table 2. Then, component (A), component (C), and component (F') indicated in Table 1 and Table 2 were uniformly mixed in a tumbler mixer, and the mixture was supplied to a co-current twin-screw kneading machine (manufactured by Japan Steel Works, Ltd., TEX (registered trademark) 30a). Glass fibers (component (B)) were supplied by side feeding through the middle of a twin-screw extruder, and the mixture was heated and kneaded at 220° C. Thus, pellets of a fiber-reinforced polypropylene-based resin composition were obtained.

A specimen such as an ISO No. 1 dumbbell was molded using each of the pellets in an injection molding machine at a molding temperature of 195° C. and a temperature of mold of 40° C., and the tensile stress at break, flexural modulus, and deflection temperature under load were measured using this specimen. Furthermore, a specimen having a grained surface and having a size of 120 mm×130 mm×2 mm was molded at a molding temperature of 220° C. and a temperature of mold of 40° C., and the external appearance of this molded product was evaluated. The results are presented in Table 1 and Table 2.

TABLE 1

| | | | | Example | | | | | | | | | |
|---|---|---|---|---|---|---|---|---|---|---|---|---|---|
| | | | (unit) | 1 | 2 | 3 | 4 | 5 | 6 | 7 | 8 | 9 | 10 |
| Composition | (A) | PP-1 | Parts by mass | 7 | 42 | 5 | 44 | 34 | 25 | 45 | 20 | 40 | 51 |
| | | PP-2 | Parts by mass | 63 | 18 | 55 | 11 | 16 | 30 | | 30 | | 18 |
| | | PP-3 | Parts by mass | | 10 | 10 | 15 | 20 | 15 | 25 | 10 | 30 | 11 |
| | (B) | T-480 | Parts by mass | 30 | 30 | 30 | 30 | 30 | 30 | 30 | 40 | 30 | 20 |
| | (C) | Polybond3200 | Parts by mass | 1 | 1 | 1 | 1 | 1 | 1 | 1 | 1 | 1 | 1 |
| | (F') | Irg1010 | Parts by mass | 0.2 | 0.2 | 0.2 | 0.2 | 0.2 | 0.2 | 0.2 | 0.2 | 0.2 | 0.2 |
| | | DMTP | Parts by mass | 0.3 | 0.3 | 0.3 | 0.3 | 0.3 | 0.3 | 0.3 | 0.3 | 0.3 | 0.3 |
| Details | Mesopentad fraction (M) | | % | 98 | 94 | 94 | 92 | 90 | 90 | 88 | 94 | 86 | 94 |
| | Olefin content (E) | | wt % | 1.7 | 0.48 | 1.49 | 0.30 | 0.43 | 0.81 | 0 | 0.81 | 0 | 0.48 |
| | Calculated value of (M − 12E) | | — | 77.6 | 88.2 | 76.1 | 88.4 | 84.8 | 80.3 | 88.0 | 84.6 | 86.0 | 88.2 |
| | Calculated value of left-hand side of Expression (3) | | — | 21.5 | 19.8 | 22.7 | 20.2 | 21.5 | 22.6 | 21.2 | 20.6 | 22.2 | 19.8 |
| Performance evaluation | Tensile stress at break | | MPa | 87 | 99 | 87 | 95 | 93 | 87 | 90 | 110 | 80 | 80 |
| | Flexural modulus | | MPa | 5250 | 6350 | 5400 | 6150 | 6220 | 5500 | 5600 | 8100 | 5030 | 4200 |
| | Deflection temperature under load (1.8 MPa) | | ° C. | 138 | 146 | 138 | 147 | 143 | 139 | 148 | 145 | 147 | 137 |
| | External appearance (determined by visual inspection) | | — | A | B | A | B | A | A | B | A | B | B |

TABLE 2

|  |  |  | (unit) | Comparative Example 1 | Comparative Example 2 | Comparative Example 3 | Comparative Example 4 | Comparative Example 5 | Reference Example 1 |
|---|---|---|---|---|---|---|---|---|---|
| Composition | (A) | PP-1 | Parts by mass | 70 | 59 |  | 64 | 60 | 53 |
|  |  | PP-2 | Parts by mass |  | 11 | 70 | 12 |  | 26 |
|  |  | PP-3 | Parts by mass |  |  |  | 9 |  | 6 |
|  | (B) | T-480 | Parts by mass | 30 | 30 | 30 | 15 | 40 | 15 |
|  | (C) | Polybond3200 | Parts by mass | 1 | 1 | 1 | 1 |  | 1 |
|  | (F') | Irg1010 | Parts by mass | 0.2 | 0.2 | 0.2 | 0.2 | 0.2 | 0.2 |
|  |  | DMTP | Parts by mass | 0.3 | 0.3 | 0.3 | 0.3 | 0.3 | 0.3 |
| Details |  | Mesopentad fraction (M) | % | 98 | 98 | 98 | 95 | 98 | 96 |
|  |  | Olefin content (E) | wt % | 0 | 0.3 | 2.7 | 0.32 | 0 | 0.7 |
|  |  | Calculated value of (M − 12E) | — | 98.0 | 94.4 | 65.6 | 91.2 | 98.0 | 87.6 |
|  |  | Calculated value of left-hand side of Expression (3) | — | 16.5 | 17.3 | 24.4 | 18.8 | 16.5 | 19.5 |
| Performance evaluation |  | Tensile stress at break | MPa | 100 | 100 | 82 | 66 | 118 | 68 |
|  |  | Flexural modulus | MPa | 6500 | 6300 | 5200 | 3380 | 8800 | 3400 |
|  |  | Deflection temperature under load (1.8 MPa) | °C. | 153 | 151 | 129 | 136 | 155 | 134 |
|  |  | External appearance (determined by visual inspection) | — | D | C | A | C | D | B |

As is obvious from Table 1 and Table 2, the molded products obtained from the fiber-reinforced polypropylene-based resin compositions of Examples 1 to 10 had an excellent external appearance having a grained surface without floating of glass fibers, and the molded products exhibited mechanical strength and deflection temperature under load in a well-balanced manner.

Meanwhile, regarding the molded products of Comparative Examples 1, 2, 4, and 5, since the calculated value of (M−12E) for the component (A) was more than 90, floating of glass fibers at the grained surface was recognized, and thus the molded products had poor external appearance. The molded product of Comparative Example 3 had an excellent grainy appearance; however, since the calculated value of (M−12E) for the component (A) was less than 74, the balance between the mechanical strength and the deflection temperature under load was poor. The molded product of Reference Example 1 had an excellent grained surface appearance; however, since the content of the reinforcing fibers was small, the balance between the mechanical strength and the deflection temperature under load was slightly poor.

The FIGURE is a graph showing the relation between the content (E) of at least one olefin-derived structural unit selected from ethylene and an α-olefin having 4 to 8 carbon atoms, and the mesopentad fraction (M) of the components (A) used in examples and comparative examples. In the graph, the range that satisfies the following Expression (1) and Expression (2) of the present disclosure is surrounded by broken lines.

$$85 \leq M \leq 99 \quad (1)$$

$$74 \leq M - 12E \leq 90 \quad (2)$$

As shown in this graph, the components (A) used in Examples 1 to 10 of the present disclosure are in the range that satisfies both Expression (1) and Expression (2), and therefore, the effects of the present disclosure are obtained. On the other hand, the components (A) used in Comparative Examples 1 to 5 are not in the range that satisfies both Expression (1) and Expression (2), and therefore, the effects of the present disclosure are not obtained. Meanwhile, the component (A) used in Reference Example 1 is within that range; however, as described above, since the content of the reinforcing fibers is small, the balance between the mechanical strength and the deflection temperature under load is slightly poor. In the present disclosure, the relation between the content (E) of at least one olefin-derived structural unit selected from ethylene and an α-olefin having 4 to 8 carbon atoms and the mesopentad fraction (M) of the component (A) is adjusted to be in a particular range, and thereby an effect of acquiring excellent heat resistance and mechanical characteristics and acquiring an excellent grained surface appearance of the molded product surface is obtained.

INDUSTRIAL APPLICABILITY

The fiber-reinforced polypropylene-based resin composition of the present disclosure can be suitably used as a material of a grain-patterned molded product in various fields such as automotive interior and exterior parts such as an instrument panel and a console box, and electrical appliance parts.

The invention claimed is:

1. A fiber-reinforced polypropylene-based resin composition comprising:
   a propylene-based polymer (A); and
   reinforcing fibers (B),
   wherein the propylene-based polymer (A) is a blend including a propylene-based polymer with high stereoregularity (A1) having a mesopentad fraction (M) that is equal to or more than 90% and equal to or less than 99.9% and a propylene-based polymer with low stereoregularity (A2) having a mesopentad fraction (M) that is equal to or more than 50% and less than 90%, and,
   in a case in which a content of at least one olefin-derived structural unit selected from ethylene and an α-olefin having 4 to 8 carbon atoms in the propylene-based polymer (A) is designated as E (% by mass) (the sum of the propylene-based polymer (A) and the reinforcing fibers (B) is designated as 100% by mass), and a mesopentad fraction of the propylene-based polymer (A) measured by $^{13}$C-NMR is designated as M (%), the following Expression (1) and Expression (2) are satisfied $$85 \leq M \leq 99 \quad (1)$$

$$74 \leq M - 12E \leq 90 \quad (2).$$

2. The fiber-reinforced polypropylene-based resin composition according to claim 1, wherein an amount G (parts by mass) of the reinforcing fibers (B) satisfies the following Expression (3)

$$(1/200)[3100 + 95 \times (100 - M) + 590 \times E] \leq G \leq 60 \quad (3).$$

3. The fiber-reinforced polypropylene-based resin composition according to claim 1, wherein the reinforcing fibers (B) are glass fibers.

4. The fiber-reinforced polypropylene-based resin composition according to claim 1, further comprising one or more components selected from the group consisting of a modified polypropylene (C), an impact resistance-improving agent (D), and a phenolic oxidation inhibitor and/or a sulfur-based oxidation inhibitor (F'), in a total amount of 0.01 to 40 parts by mass with respect to 100 parts by mass of the sum of the propylene-based polymer (A) and the reinforcing fibers (B).

5. A molded product formed by molding the fiber-reinforced polypropylene-based resin composition according to claim 1.

6. The molded product according to claim 5, which is formed by injection molding the fiber-reinforced polypropylene-based resin composition.

7. The molded product according to claim 5, which has a grained surface.

8. The molded product according to claim 5, which is a molded product for an automotive interior or exterior part or an electrical appliance part.

* * * * *